United States Patent [19]

Boening

[11] 3,907,970
[45] Sept. 23, 1975

[54] PROCESS FOR REMOVING SULFUR DIOXIDE FROM GAS STREAMS CONTAINING SAME AND ESPECIALLY FURNACE AND CHEMICAL PLANT WASTE GASES

[75] Inventor: Guenter Boening, Bergen-Enkheim, Germany

[73] Assignee: Metallgesellschaft Aktiengesellschaft, 14, Reuterweg, 6 Frankfurt am Main, Germany

[22] Filed: July 9, 1973

[21] Appl. No.: 377,734

[30] Foreign Application Priority Data
July 18, 1972   Germany.................... 22351231

[52] U.S. Cl................................ 423/242, 423/522
[51] Int. Cl.²................................ C01B 17/00
[58] Field of Search.......... 423/242, 244, 522, 534

[56] References Cited
UNITED STATES PATENTS

| | | | |
|---|---|---|---|
| 3,318,662 | 5/1967 | Pauling........................ | 423/522 |
| 3,803,804 | 4/1974 | Arash. et al.................. | 423/244 |

FOREIGN PATENTS OR APPLICATIONS

| | | | |
|---|---|---|---|
| 1,052,188 | 12/1966 | Great Britain................. | 423/522 |
| 1,098,557 | 1/1968 | Great Britain................. | 423/244 |
| 1,054,071 | 4/1959 | Germany...................... | 423/242 |

*Primary Examiner*—Oscar R. Veritz
*Assistant Examiner*—Gregory A. Heller
*Attorney, Agent, or Firm*—Karl F. Ross et al.

[57] ABSTRACT

A waste gas containing sulfur dioxide is passed upwardly in succession through a replaceable lower bed of a carbon-containing catalyst and a nonreplaceable upper bed of carbon-containing catalyst in counterflow to water or dilute sulfuric acid sprayed onto the catalyst from above. The sulfur dioxide-containing gas is cooled by direct contact with the sulfuric acid drained from the beds before the gas encounters the catalyst. This sulfuric acid is then concentrated by evaporation of water therefrom. The lower layer can be replaced by withdrawing trays containing the catalyst material in a horizontal direction from the reactor.

1 Claim, 5 Drawing Figures

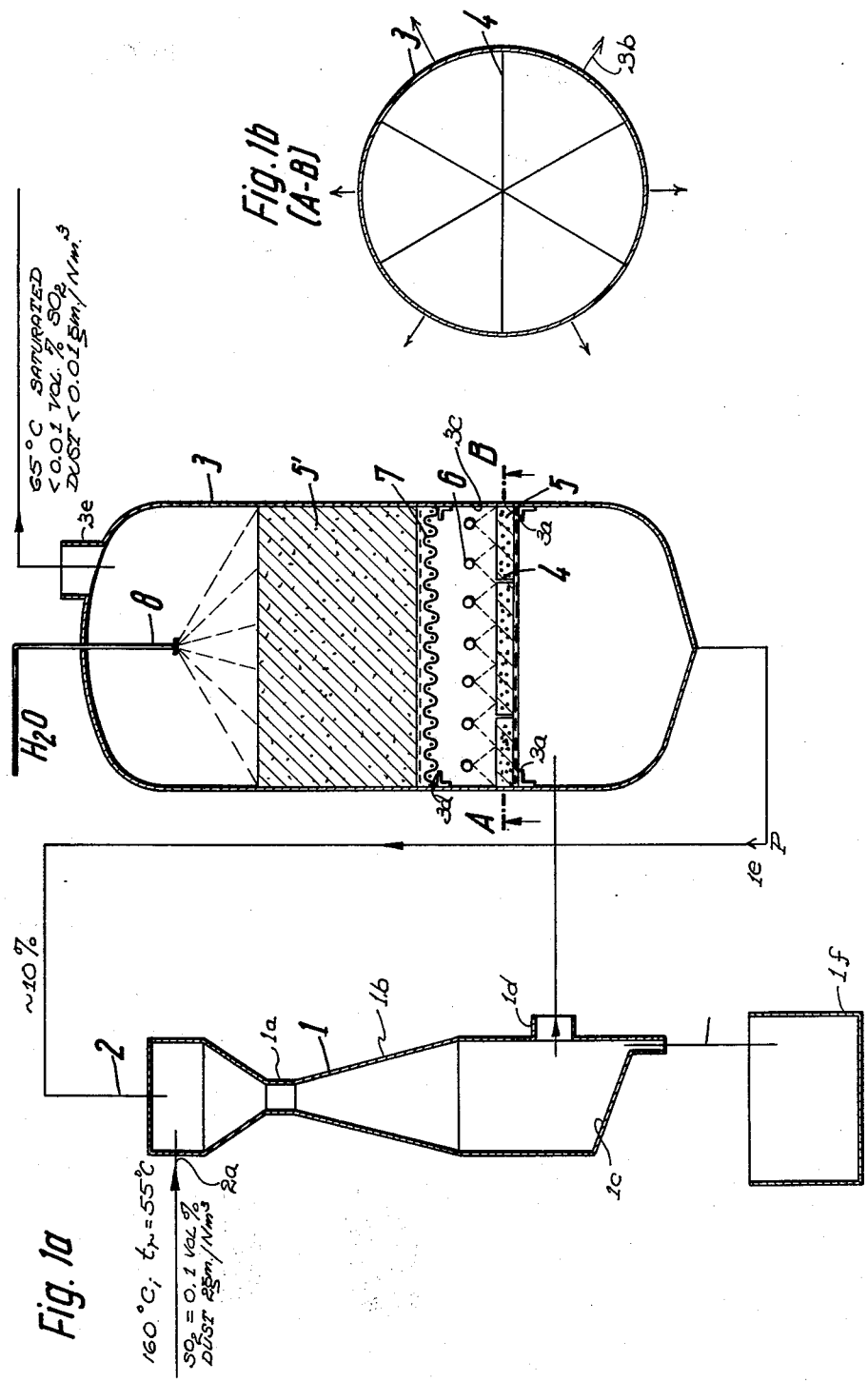

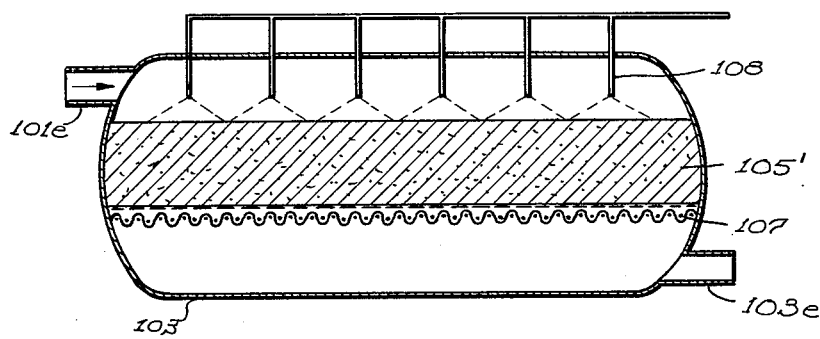
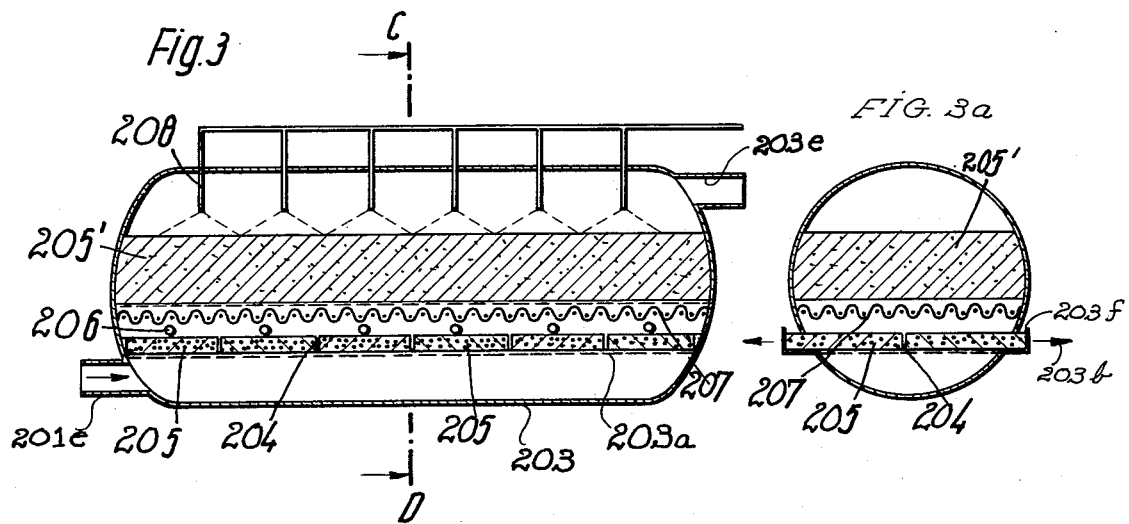
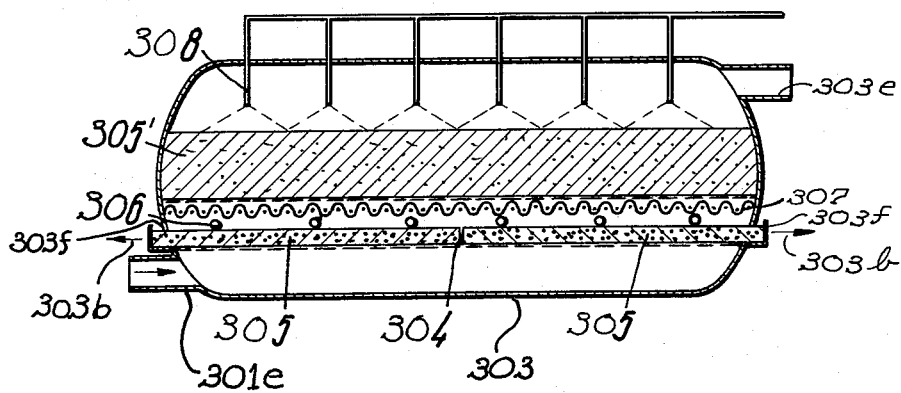

PROCESS FOR REMOVING SULFUR DIOXIDE FROM GAS STREAMS CONTAINING SAME AND ESPECIALLY FURNACE AND CHEMICAL PLANT WASTE GASES

1. Field of the Invention

My present invention relates to a method of and an apparatus for the removal of sulfur dioxide from gases containing same and, more particularly, to a process for recovering sulfur dioxide from a waste gas of a furnace, an industrial process or a chemical process, which is more economical and efficient than earlier $SO_2$-removal processes.

2. Background of the Invention

The problem of environmental pollution with waste gases containing sulfur dioxide and released to the atmosphere is substantial, since the sulfur dioxide arises in many chemical processes, in metallurgical reactions and even from the combustion of sulfur-containing fuels of a solid, gaseous or liquid nature.

For example, in the roasting of sulfidic metal ores, the metal sulfide is transformed into the metal oxide and sulfur dioxide, the sulfur dioxide being carried off in the exhuast gas. In chemical plants for the production of synthetic resins, paper and the like, sulfites are used and frequently waste gases containing sulfur dioxide are generated. In the burning of high-sulfur petroleum-type fuels, sulfur dioxide may be released as a flue gas.

Sulfur dioxide in gases released into the atmosphere, is not only detrimental to the environment because of the acidity of the gas when dissolved in water, but is itself noxious to animal and plant life and is destructive to paint and other structural materials. Consequently, considerable effort has been expended in developing techniques for removing sulfur dioxide from waste and exhaust gases, especially since the sulfur dioxide is a valuable substance in its own right and can be liquefied or converted to acid for reuse in chemical or other processes.

It has been proposed heretofore to remove sulfur dioxide from echaust gases by producing sulfuric acid therefrom. An exhaust gas is desulfurized in the sense that sulfur dioxide is oxidized in the presence of oxygen and water on a carbon-containing catalyst at a temperature of about 40°–80°C and the resulting acid is collected and, when desired, concentrated by evaporation of water therefrom.

Problems have been encountered with such systems where beds of the carbon-containing catalyst were used, since the gaseous phase and the liquid phase were passed in uniflow (codirectionally) through the bed which was highly sensitive to the presence of dust in the gas stream. It was vital, therefore, to prepurify the gas since substantially any level of dust rapidly would clog the carbon bed and require replacement thereof. As a consequence, the system was uneconomical.

3. Objects of the Invention

It is the principal object of the present invention to provide an improved method of and apparatus for removing sulfur dioxide from a gas stream, especially a waste gas or exhaust gas, whereby the disadvantages of the systems mentioned earlier are obviated.

Another object of this invention is to provide a highly efficient low-cost and effective system for the removal of sulfur dioxide from a waste gas containing same.

4. Summary of the Invention

I have now found that it is possible to obviate the aforedescribed disadvantages and to provide a system which can operate for long periods independently of the considerations mentioned earlier when the catalyst system comprises two vertically superposed layers including a lower first layer and an upper second layer, when the gas stream containing the sulfur dioxide is passed upwardly in succession through these layers and the liquid phase, namely, water or dilute sulfuric acid is passed downwardly through the two beds and preferably is sprayed independently onto each of these beds. According to a feature of the invention, therefore, the sulfur-dioxide-containing gas is passed upwardly from bottom to top through two layers of carbon-containing catalyst, the first layer contacted by the gas being replaceable while the upper layer is permanent.

In other words, the first layer is replaced as a positive step in the present method at an interval (discussed in detail below) determined by the efficiency of the overall system while the upper layer is retained permanently and needs no replacement. The first layer preferably comprises a granular carbon-containing catalyst having a particle size that is equal to or greater than that of the second layer. As noted above, the liquid phase is caused to pass through the layers downwardly in counterflow to the rising gas stream and it has been found to be particularly advantageous to periodically wash the first or lower layer with additional sprayed liquid beyond that used to treat the gas.

Most surprisingly, when the gas is passed upwardly through the beds opposite to the direction of flow of the sprayed liquid, the sulfur dioxide removal can be increased by about 10% by comparison to uniflow (codirectional flow) of gas and liquid phases.

Clogging is avoided in the catalyst where the first or lower layer consists of relatively coarse particles, by washing the lower catalyst bed with water periodically or continuously. Furthermore, the system has been found to be operative with dust content as much as 200 $mg/m^3$ STP and this is again a surprising advantage of the present system since dust proportions above 20 $mg/m^3$ STP level have hitherto been found to clog the carbon-containing catalyst beds to a substantial degree.

The apparatus according to the present invention comprises a direct-contact scrubber and gas cooler upstream of the carbon-containing catalyst beds and preferably of the Venturi type, the scrubber and gas cooler being fed with the sulfuric acid solution drained from the catalyst beds and serving to collect dust from and to cool the sulfur-dioxide-containing gas stream. In addition, since a portion of the sulfuric acid is evaporated in the scrubber and cooler, the preliminary stage also assists in concentrating the sulfuric acid to render the latter more economical.

Downstream of the direct-contact scrubber and gas cooler, is provided and reactor which comprises two beds of catalysts disposed one above the other. Spray means is disposed at least above the upper bed and serves to discharge sulfuric acid or water through the bed for collection therebelow.

Means is provided for passing the sulfur-dioxide-containing gas stream upwardly through the beds from bottom to top opposite to the flow of sulfuric acid which drains from the upper catalyst bed to the lower catalyst bed and thence into a sump below the two beds for collection and use in the scrubber and cooler mentioned earlier.

As previously described, the lower layer is replaceable and means is provided for enabling such replacement with a minimum downtime of the apparatus. Advantageously, the replaceable layer is provided in a plurality of adjacent individual flat trays which are inidividually replaceable in a horizontal direction. To this end, the trays may be horizontally displaceable along and transversely to the axis of a horizontal cylindrical reactor and can be removed from the reactor in this direction of displacement, preferably via later openings formed in the reactor wall.

According to another feature of the invention, both the first and second layers consist of or contain the carbon catalyst and the catalyst in the first or lower layer has a particle size equal at least to that of the catalyst of the second layer while spray means is provided between the first and second layers for discharging an additional quantity of sulfuric acid or water through the lower or first catalyst bed. The volume of the first layer is preferably 5–20% of the volume of the second layer.

A particularly surprising accomplishment with the system of the present invention is that not only does it increase the sulfur-dioxide removal from the gas stream by 10% or better, but it allows desulfurization of an exhaust gas containing up to and above 200 mg/m$^3$ (STP) of dust, i.e. more than 10 times the maximum permissible dust content known to be usable with conventional systems.

If one attempts, with a conventional uniflow system in which the gas and liquid phases were passed downwardly through the reactor, to employ a dust content of 200 mg/m$^3$ (STP), there is a very rapid clogging of the uppermost catalyst layer and a contamination of the entire catalyst layer so that a prolonged shutdown of the apparatus is necessary until the catalyst layer is replaced. In the system of the present invention, even this dust level does not detrimentally affect the overall process and indeed the requirements of the scrubber and cooler are substantially less stringent because the particulate content of the gas stream may be greater without any disturbing effect. It should be noted that the present system may be used to treat even exhaust gases which contain dust in such a finely distributed form that a scrubber cannot extract it from the gas stream to the levels hitherto considered essential for sulfur dioxide removal.

The soiling of the second catalyst layer is apparently prevented in the system of the present invention by washing the first layer and replacing the same when it has been depleted without shutting down the machine. The point of replacement may be determined by observing the pressure rise across the first and second layers so that the contamination of the first layer, accompanied by a pressure buildup beneath it, will be readily recognized and the first layer changed without permitting any substantial contamination of the second layer. In one mode of operation, the pressure behind the first or lower layer is measured or detected and, upon the monitoring of the pressure rise, a quantity of water or sulfuric acid is sprayed onto the first layer in the space between the upper and lower layers to partially wash solid particles trapped in the first layer therefrom. When this procedure is used, even the first layer may be employed from one to two years prior to replacement. This layer can be replaced without interrupting the operation of the apparatus in a simple manner because the first layer is constituted at a catalyst bed in flat trays with a gas-permeable bottom, the trays being laterally withdrawn from the reactor vessel and being replaced by new trays. Preferably the reactor is horizontal and cylindrical and the tray is introduced from one side and an old tray is pushed out at the other without disturbing the operation or providing any space through which the gas may flow into contact with the second layer without passing through the first. The first layer may be present in an amount of only 5–20% of the volume of the second layer because it serves partly as a catalyst and significantly as a retainer for the dust which is carried by the exhaust gas.

5. Description of the Drawing

The above and other objects, features and advantages of the present invention will become more readily apparent from the following description, reference being made to the accompanying drawing in which:

FIG. 1a is a flow diagram illustrating the process according to the invention;

FIG. 1b is a sectional view taken along the line A-A of FIG. 1a;

FIG. 2 shows a reactor traversed by a gas from top to bottom according to the present invention;

FIG. 3 shows a reactor according to the invention with trays which extend transversely to the axis of the cylinder;

FIG. 3a is a cross-sectional view taken along the line C-D of FIG. 3; and

FIG. 4 shows the same reactor with longitudinally extending flat trays.

6. Specific Description

In FIGS. 1a and 1b I show a system for the removal of sulfur dioxide from an exhaust gas containing a large quantity of dust. The apparatus comprises a venturi scrubber and cooler 1 having a central inlet 2 for the liquid phase and a lateral inlet 2a for the gas phase. The venturi constriction is represented at 1a and forms a passage in which the liquid and gas surfaces are intimately contacted with one another prior to expansion at 1b in the downward direction above a sump 1c. The sump collects the great percentage of the dust washed from the gas and is located below a lateral outlet 1b from which the moist gas moisture is lead via a line 1e to the bottom of a catalyst reactor 3.

The reactor 3 is provided with a pair of ledges 3a upon which trays 4 of carbon-containing catalyst 5 are positioned, the trays being arrayed in sectors as shown in FIG. 1b so that they may be readily removed through a lateral slot in the wall of the reactor as represented by the arrows 3b. The bottoms of the trays are gas permeable, i.e. composed of wire mesh or perforated sheet metal to permit the gas to pass upwardly into a space 3c above the first bed of carbon containing catalyst formed by the trays and the catalyst layer 5.

Above the first bed of carbon-containing catalyst there is provided an array of spray nozzles 6 adapted to dispense a washing liquid, e.g. dilute sulfuric acid or water downwardly in a direction counter to the upward flow of gases.

The reactor 3 is also formed with a ledge 3d of which a perforated plate 7 is mounted to carry the permeable bed 5' of carbon-containing catalyst, the main spray nozzle 8 being provided thereabove.

An outlet 3e at the head of the reactor discharges the exhaust gas, substantially freed from particulates and sulfur dioxide to a further purifying station or for release to the atmosphere.

The product collected in the sump below the first catalyst layer 5 is a dilute sulfuric acid solution which is displaced by a pump into the venturi scrubber 1.

In FIG. 2 I have shown a reactor of a more conventional construction which consists of a horizontally elongated cylindrical vessel 101, 103 provided with a first grate 107 upon which a bed 105' of catalyst is provided. An array of spray nozzles 108 direct dilute sulfuric acid or water onto the bed and an inlet 101e is provided to admit the sulfur dioxide containing waste gas. The gas and the liquid phases pass downwardly through this reactor in the same direction and the bed 105' is readily plugged. The purified gas is discharged at 103e.

In FIG. 3, I have illustrated a modification according to the invention wherein the replaceable layer is removed laterally. In this embodiment, the reactor 203 is horizontally elongated and cylindrical and a perforated shelf 203a is provided above the sump of the reactor. A plurality of trays 204 is provided on this shelf, the trays being insertable and removable through slots 203f formed in the wall of the housing. As illustrated in FIG. 1a, the trays 204 are withdrawn laterally and a similar tray is inserted in the opposite direction. The removal direction is represented by the arrows 203b. Of course, the trays may be inserted from one side to push the depleted trays out through the other side if desired. Each of the trays carries a carbon-containing catalyst layer 205 so that all of the trays together define the first bed or layer of carbon-containing catalyst. Gas is admitted to the reactor through an inlet 201e below the carbon-containing catalyst layer 205. Spray nozzles 206 are provided over each pair of trays 204 and supply the additional washing liquid as described and a grate 207, spaced thereabove to carry the permanent catalyst bed 205' which may have a volume of 5 to 20 times that of the carbon catalyst layer 205. Spray nozzles 200 are provided above the bed 205' and the exhaust gas, freed from sulfur dioxide and particulates, is discharged at 203e.

In the modification of FIG. 4, the same basis structure is provided except that the vessel 303 has slits 303f at its ends so that trays may be introduced longitudinally into the reactor and withdrawn therefrom in the same direction (arrow 303b). In this embodiment as well, the trays are represented at 304 and the first layer of carbon-containing catalyst at 305 while spray nozzles 306 are disposed directly above the catalyst 305. The permanent bed 305' of carbon-containing catalyst is mounted upon a grate 307 and is disposed beneath the nozzles 308. In this embodiment as in the embodiment of FIG. 3 the gas inlet 301e is disposed beneath the first catalyst layer and the gas outlet is at 303e, above the upper bed 305'.

7. Specific Example

Using the system of FIG. 1a, flow gas from the furnace of a boiler is fed into a venturi scrubber. The gas has a temperature of 160°C, a dew point of 55°C, a dust content of 2 g/m$^3$ (STP) and a sulfuric dioxide content of 0.1° by volume.

Sulfuric acid solution (10% concentration) drawn from the catalyst reactor, is introduced into the venturi scrubber to cool the flow gas and remove particulates therefrom.

In the outlet 1d of the venturi scrubber, the dew point has been increased to 62°C and the temperature dropped to 65°–70°C. The sulfur dioxide content remains unchanged at about 0.1% by volume while the dust content is about 0.2° g/m$^3$ (STP). The increase in the dew point represents an evaporation of water from the sulfuric acid and hence a concentration of the latter and the sulfuric acid collected in the settling tank 1f has a concentration of 25% and can be decanted from the accumulated solids.

The pretreated gas, which is almost saturated with moisture, enters the reactor below the trays 4 and passes through the catalyst 5 of activated coke. The layer 5 is periodically washed with water or dilute sulfuric acid, e.g. for three minutes over intervals of 15 to 60 minutes of operation, depending upon the dust content in the gas.

After traversing the catalyst 5, the gas passes upwardly through the second catalyst layer 5' consisting of the same granular activated coke as the first layer 5. It has been found to be desirable to either have the catalyst in the first layer 5 of the same granometry (particle size 456 mm) as the catalyst in layer 5' or to provide a larger particle size in layer 5 (8–16 mm) than in layer 5' (456 mm). Water or dilute sulfuric acid is sprayed onto the catalyst 5'. The sulfur dioxide is catalytically reacted in the presence of the sulfuric acid, water and atmospheric oxygen to sulfur dioxide which is absorbed in the water or sulfuric acid to increase the concentration of sulfuric acid to 8–12% as it drains into the bottom of the reactor. The descending liquid between the first catalyst layer 5 and the bottom of the reactor encounters the rising gas stream and effectively washes the gas stream further to eliminate some additional dust therefrom. The 8–12% sulfuric acid is at a temperature of 65°–70°C and, as noted, is introduced into the venturi absorber.

In the prior art process, using a reactor as shown in FIG. 2, about 90% of the sulfur dioxide was removed from the gas in a catalyst bed of the same size as the total catalysts of the reactor FIGS. 1a or 3. By contrast, from 91 to 92% of the sulfur dioxide is removed in the process of the present invention when the same volume of catalyst is used. With the gases containing as much as 200 mg of dust per m$^3$ (STP) the catalyst was contaminated beyond further utility in short order although the system of FIG. 1a can operate continuously even when the dust content exceeds 200 mg per m$^3$ (STP). Even when the first layer 5 is washed, operation continues and with such washing, periods of months may pass without removal of the first catalyst layer. Since the trays can be readily withdrawn and inserted, the first catalyst layer can be replaced gradually or at once without shutting down the plant.

The product of the system of FIG. 1a, as illustrated, was a waste gas at a temperature of 65°C, saturated with moisture, having a sulfur dioxide content of less than 0.01 volume % $SO_2$ (about 0.008% by volume) and a dust content less than 0.01 g/m$^3$ (STP).

With reference to FIGS. 3 and 4, it should be noted that the trays can be carried by tees on which they can be pushed back and forth transversely to the axis of the cylindrical vessel or in the longitudinal direction thereof, the trays being sealed in a gas type manner at the slots or windows through which they can be inserted or removed.

What is claimed is:

1. In a process of removing $SO_2$ from gases in which the $SO_2$-containing gas is catalytically reacted in the presence of water and oxygen to form sulfuric acid, which is washed out of the catalyst by continuously or intermittently spraying the same with water or dilute sulfuric acid, the $SO_2$-containing gas is cooled by direct contact with the drained sulfuric-acid before the $SO_2$-containing gas is catalytically reacted, and the sulfuric acid is concentrated by the evaporation of water therefrom, the improvement in which the $SO_2$-containing gas is conducted from bottom to top through two layers of carbon-containing catalyst in a common tower, wherein the lower bed of catalyst is composed of a plurality of adjacent layers of the catalyst on respective horizontal trays, and comprising the steps wherein said lower bed of catalyst is replaced by horizontally removing said trays and replacing them with trays carrying fresh carbon containing catalyst without interrupting the continuity of gas flow through said beds and wherein the volume of said lower bed is 5 to 20% of the volume of the upper bed, said lower bed consisting of a carbon containing granular catalyst larger in particle size than that of said upper bed, the lower bed of carbon containing granular catalyst being periodically and directly washed with liquid independently of the upper bed without interrupting the continuity of gas flow through the beds.

* * * * *